United States Patent [19]

Porosoff et al.

[11] Patent Number: 5,102,923
[45] Date of Patent: Apr. 7, 1992

[54] RIGID POLYURETHANE AND POLYISOCYANURATE FOAMS

[75] Inventors: Harold Porosoff, Scarsdale, N.Y.; Balwant Singh, Stamford, Conn.; Kurt C. Frisch, Grosse Ile, Mich.

[73] Assignee: American Cyanamid Company, Stamford, Conn.

[21] Appl. No.: 640,668

[22] Filed: Jan. 14, 1991

[51] Int. Cl.$^5$ .............................................. C08G 18/14
[52] U.S. Cl. .................................... 521/159; 521/166
[58] Field of Search ................................ 521/159, 166

[56] References Cited

U.S. PATENT DOCUMENTS 4,708,984 11/1987 Forgione et al. ...................... 528/73

Primary Examiner—Maurice J. Welsh
Attorney, Agent, or Firm—Roger S. Benjamin

[57] ABSTRACT

Novel rigid polyurethane and/or polyisocyanurate foams are disclosed which have fine cell structure, low K-factor, and flame retardance. These foams are prepared by the reaction of a polyisocyanate with heterocyclic nitrogen containing polybeta-hydroxy urethane functional polyols which act as chemically bound flame retardants. Also disclosed are novel modified poly-beta-hydroxyalkyl carbamylalkylated heterocyclic nitrogen containing polyols useful for the formation of rigid foams.

33 Claims, No Drawings

RIGID POLYURETHANE AND POLYISOCYANURATE FOAMS

FIELD OF THE INVENTION

This invention relates to novel hydroxyalkyl carbamylalkylated polyols and polyol compositions for use in the manufacture foamed polymers. More specifically, it is related to the production of improved polyurethane and polyisocyanurate foams, the improvement comprising the use of the novel flame retardant polyols as blends with commercial polyols to improve the combustion resistance, cell structure friability, or insulation properties thereof as measured in well known tests.

BACKGROUND OF THE INVENTION

The production of rigid polyurethane (PU) and polyisocyanurate foams from organic polyisocyanates and polyester or polyether polyols having an average of two or more hydroxyl groups per molecule has been well established over the past several decades. These foams have played an increasingly important role in the construction, refrigeration and packaging industry due to their excellent insulation properties. Multimillion pounds of rigid PU and polyisocyanurate foams are used annually for this purpose.

The vast majority of these foams utilize chlorinated fluorinated hydrocarbons (CFCs) as the blowing agents. These have come under intense environmental concern due to their ozone-depleting properties. More recently, the second generation hydrogenated chlorinated fluorinated hydrocarbon (HCFCs) emerged as replacements for CFCs; these are believed to be substantially less ozone-depleting than the CFC's A number of other blowing agents such as low boiling hydrocarbons such as pentane have also been cited but with no commercial success. Replacement of CFCs and HCFCs with water ($CO_2$ blown) using commonly available polyols produces foams with inferior initial and aged thermal conductivities (K-factors). Other physical properties, deficiencies are increased mold release time, poor flow, decreased dimensional stability and increased open cell content which in turn contribute to poor insulation properties. Through the use of modified polyols, in particular the amine-based polyols, surfactants, and blowing agents such as, chlorofluorocarbons or hydrofluorochlorocarbons with or without water, rigid foams have been prepared in experimental quantities which have low K-factors. Attempts to use water ($CO_2$) as the sole blowing agent (100% $H_2O$ blown) result in foams which have severe K-factor and physical properties deficiencies. At molded core densities of greater than 2 PCF (pounds per cubic foot), K-factors for all $CO_2$ blown foams are 25-30% higher than for example with CFC-11. These increase substantially during aging under ambient conditions. At densities of lower than 2 PCF (32.03 Kg./cu. meter), K-factors increase drastically, since the foams tend to shrink during heat and cold cycles resulting in increased surface friabilities.

ADDITIONAL PRIOR ART

A number of new polyols have appeared in the prior art. These polyols provide increased flame resistance properties but thermal conductivities of the resulting foams are deficient particularly for the $CO_2$ blown systems versus foams blown with CFC blowing agents. Specific prior art references using as flame retardants nitrogen containing polyols are:

Wismer, et al. U.S. Pat. No. 3,328,321 is directed to polyurethanes prepared from polyisocyanates and a polyhydroxy resinous reaction product of an amino-s-triazine with an alkylene carbonate or an alkylene oxide. Among the amino-s-triazines that are suggested is melamine. In the working examples Wismer et al, disclose a polyol prepared by reacting benzoguanamine with ethylene carbonate and the reaction of this polyol with an isocyanate to prepare a polyurethane foam.

Edwards, et al. U.S. Pat No. 3.297,597 is similarly directed to Mannich condensates prepared by reacting a phenolic compound with formaldehyde and diethanolamine which are then alkoxylated, preferably with propylene oxide, to provide polyols useful in the manufacture of rigid polyurethane foams.

Edwards, et al. U.S. Pat. No. 4,137,265 is similarly directed to Mannich condensates prepared by reacting a phenolic compound with formaldehyde and diethanolamine which are then propoxylated and used in the manufacture of rigid polyurethane foam.

Rudner, et al. U.S. Pat. NO. 4,139,501 is directed to the manufacture of flexible polyurethane foams wherein the fire retardancy properties of the foams are improved by utilizing, in the preparation, a derivative of melamine wherein one or more of the hydrogens have been replaced by a hydroxymethyl group.

Mao, et al U.S. Pat. No. 4,147,678 proposed to improve the fire retardancy properties of polyurethane elastomers by utilizing a hexaalkoxymethyl melamine as a polyol component.

Owen, U.S. Pat. No. 4,198,490 is directed to the manufacture of rigid polyurethane foam from a polyol reaction product containing a N-alpha-alkylol, such as trimethylolmelamine.

Yukuta, et al. U.S. Pat. No. 4,221,875 is directed to rigid polyurethane foams having flame resistance which are prepared from a mixture comprising a polyhydroxy compound such as an ethylene oxide adduct of a material containing a plurality of hydroxyl groups (i.e., sucrose or sorbitol), an organic polyisocyanate, a blowing agent and powdered melamine. From 20 to 60 parts by weight of powdered melamine per 100 parts of polyhydroxy compound are recommended.

Nissen, et al. U.S. Pat. No. 4,293,657 discloses the preparation of a stable dispersion useful in the preparation of polyurethane foam prepared by using finely powdered melamine with a stabilizer such as silicic acid, salts of perfluorinated alkylcarboxylic acids or salts of fatty alcohol sulfates.

Jacobs, et. al. U.S. Pat. No. 4,312,988 is directed to the preparation of hydroxy terminated melamine derivatives wherein melamine is reacted with isopropanolamine in order to minimize the amount of isomelamine impurities that are normally formed when melamine is reacted with an alkanolamine.

Poclinsky, Jr. U.S. Pat. No. 4,317,889 and the numerous U.S. patents cited therein disclose the use of melamine derivatives such as hydroxymethylmelamines, melamine phosphate, hexaalkoxymethylmelamine, etc, as components for use in the manufacture of flexible polyurethane foams.

Johnson U.S. Pat. No. 4,369,258 is directed to polyurethane foams prepared by reacting a polyisocyanate with a mixture of a melamine polyol with a polyol derived from a polyester or a polyether polyol.

A Technical Bulletin entitled "MELPOL ™" by American Cyanamid Company in Nov.1983, discloses that hydroxypropylmelamine resins having hydroxyl and aminotriazine functionality can react with isocyanates and produce urethane foams and also isocyanurate foams showing a significant decrease in friability and an increase in oxygen index. However, the use of MELPOL ™ polyol in more than catalytic quantities can result in a large, undesirable exotherm due to the inherent basicity of the MELPOL ™ polyol.

It has now been unexpectedly found that more than catalytic amounts of the novel heterocyclic polyols (hydroxyalkyl carbamylalkylated polyols) to be described herein can be used alone or in blends with other polyols to produce 100% water blown, $H_2O$/CFC blown, or CFC-blown rigid polyurethane and polyisocyanurate foams having improved properties in comparison with those of the prior art. The foams of this invention have improved retardance to burning, finer cell-structure and a lower K-factor (better insulation properties) at substantially lower foam densities. The improved foams of this invention are less friable and show improved dimensional stability. It has also been unexpectedly found that other auxilliary agents such as propylene carbonate, not only improve the solubility of the novel heterocyclic polyols in commercial polyols, but also decrease the viscosity of the resulting blends. The new foams are characterized by a preponderance of closed cells (96%).

Accordingly, it is an object of this invention to provide novel rigid foams with good insulation properties so that smaller amounts of materials will give the same thermal barrier properties that prior art materials provide.

It is also an object of this invention to provide novel rigid foams with a low degree of combustibility where the heterocyclic nitrogen containing polyols also function as chemically bound flame retardants so that they do not increase the hazards associated with their intended locations of It is also an object of this invention to provide novel rigid foams with a high degree of physical integrity so that they may remain in their intended locations under adverse conditions. It is also an object of this invention to provide novel rigid foams with complete or partial replacement of fluorine-containing blowing agents with their attendant adverse environmental effects and/or low-boiling hydrocarbons which are flammable. These and other objects of the invention will become apparent from the present specification.

SUMMARY OF THE INVENTION

According to this invention, in one of its major aspects, there are provided rigid polyurethane and/or polyisocyanurate foams having predominantly ells comprising a product of reacting:

A.
  (i) an organic polyisocyanate, or
  (ii) an organic polyisocyanate and a tertiary amine catalyst in an amount effective to produce a urethane-urea-modified isocyanurate;
B. a polyhydroxy-containing material comprising
  (i) a heterocyclic nitrogen reactant containing two or more beta-hydroxy urethane groups, or
  (ii) a combination of B (i) and at least one other polyhydroxy-containing material; and
C. a blowing agent.

The invention contemplates among its embodiments, polyurethane and/or polyisocyanurate foams. The term; "polyurethane and/or polyisocyanurate foams" as used in this specification refers to the following types of rigid foams."
(1) foams produced by the reaction of polyisocyanates and polyols absent a trimerization catalyst (polyurethane foams)
(2) foams produced by the reaction of polyisocyanates and polyols wherein excess polyisocyanate and a trimerization catalysts has been added to the reaction system (polyisocyanurate foams).

Foams of the types (1) and (2) additionally make contain urea linkages produced by the presence of water (urea modified polyurethane and/or polyisocyanurate foams).

Preferred features of the invention include polyurethane or polyisocyanurate foams as defined above wherein component A (i) comprises toluene diisocyanate (TDI), 4,4,'-diphenylmethane diisocyanate (MDI), polymethylene polyphenylene polyisocyanate (polymeric MDI) or a mixture of any of them, component A (ii) comprises a polyamino trimerization catalyst and toluene diisocyanate (TDI), 4,4,'-diphenylmethane diisocyanate (MDI), polymethylene polyphenylene polyisocyanate (polymeric MDI), tetramethylxylylene diisocyanate (TMXDI ®aliphatc isocyanate, product of American Cyanamid Co., Wayne, NJ, USA), 3:1 meta-tetramethylxylylene diisocyanate/trimethylol-propane adduct (CYTHANE 3160 ®isocyanate, product of American Cyanamid Co.), or a mixture of any of them, and both components have an isocyanate functionality of about 2 to 4. Especially preferred are such foams wherein components A (i) and (ii) have a functionality between 2.5 and 2.7. Special mention is made of polyurethane or polyisocyanurate foams wherein component A (i) comprises polymeric MDI and component A (ii) comprises polymeric MDI and diazabicyclooctane (DABCO ®catalyst, a product of Air Products Corp.) as a trimerization catalyst.

Component B (i) as recited above comprises a heterocyolic nitrogen containing polyol containing at least two beta-hydroxy terminated carbamate groups on a nucleus selected from melamine, an oligomer of melamine, an alkyl/aryl guanamine selected from benzoguanamine, an oligomer of benzoguanamine, acetoguanamine, an oligomer of acetoguanamine, cyclohexylguanamine, an oligomer of cyclohexylguanamine, a glycoluril, an oligomer of a glycoluril, a 4,5-dihydroxy-2-imidazolidone compound, an oligomer of such an imidazolidone compound, or a mixture of any of the foregoing. Special mention is made of foams wherein component B (i) is derived from melamine, acetoguanamine, benzoguanamine, a glycoluril, an oligomer of any of them or a mixture of any of them. Especially preferred are polyurethane or polyisocyanurate foams wherein component B (i) is derivem from melamine or an oligomer thereof.

In addition the invention contemplates polyurethane or polyisocyanurate foams as defined above wherein component B (ii) further comprises a polyester polyol, a polyether polyol, an amine-based polyol or a mixture of any of them.

Preferred features include foams wherein component C consists essentially of water; those wherein component C also includes as a blowing agent ∓CFC"; and those which are the product of reacting A, B, C and, also;

D. a surfactant;
E. a curing catalyst;
F. a flame retardant compound; or
G. a viscosity modifying agent;
H. a mixture of any of D, E, F, and G.

Especially preferred are such foams wherein surfactant component D comprises a silicone surfactant; those wherein curing catalyst E comprises dibutyltin dilaurate; those wherein flame retardant compound F comprises tri(2-chloropropyl) phosphate; and those wherein viscosity modifying agent G is propylene carbonate.

A major aspect the invention includes articles shaped from rigid polyurethane or polyisocyanate foams as defined above.

DETAILED DESCRIPTION OF THE INVENTION

The heterocyclic polyols useful for the present invention are disclosed in U.S. Pat. No. 4,708,984 which is incorporated by reference herein. These polyols are the reaction products of hydroxyalkyl carbamates with amino resins. Many such resins are commercially available from American Cyanamid Company. They can also be made following procedures well known to those skilled in this art, being the reaction products of heterocyclic polyamino compounds such as melamine with formaldehyde and lower $C_1$ to $C_6$ alcohols. The hydroxyalkyl carbamates are also readily obtainable from cyclic alkylene carbonates and ammonia.

The heterocyclic polyols useful for the present invention must contain at least two beta-hydroxy terminated carbamate groups.

The nucleus of the nitrogen containing heterocyclic compounds useful in this invention are desirably selected from melamine, oligomers of melamine, and alkyl/aryl guanamines such as benzoguanamine, oligomers of benzoguanamine, acetoguanamine, oligomers of acetoguanamine, cyclohexylguanamine, oligomers of cyclohexylguanamine, glycolurils, oligomers of glycoluril, 4,5-dihydroxy-2- imidazolidone compounds, oligomers of such imidazolidone compounds, and mixtures of any of the foregoing. Melamine, aceto-and benzoguanamine, glycolurils and their oligomers are preferred.

As used herein, the term "oligomers of melamine, benzoguanamine, acetoguanamine, glycolurils and 4,5-dihydroxy-2-imidazolidonesm refers to amino resins prepared from these compounds by reaction with aldehydes such as formaldehyde. They may in addition include condensation products of melamine, etc., with glyoxal and/or formaldehyde.

The sites on the nitrogen-containing heterocyclic compound nucleus not occupied by the hydroxyalkyl carbamate and/or the hydroxyalkyl amide substituents may be occupied by any non-interfering substituents but it is preferred that such substituents be hydrogen, methylol and/or alkylated methylol groups, alkylcarbamyl methylated substituents, alkyl amidomethyl, vinyl amidomethyl, hydroxyalkylaminomethyl and dihydroxyalkyl aminomethyl substituents.

Melamine Compounds.- The novel melamine type compounds useful as polyol reactant B (i) in the invention are represented by Formula (I):

$$C_3N_6(CH_2)_{(m+n)}(H)_{6-(m+n)}(R_1)_m(R_2)_n \qquad (I)$$

wherein,
m >= 2
n >= 0
6 >= (m+n) >= 2 and where $R_1$ is a beta-hydroxy carbamate substituent selected from the group consisting of
—NH-CO$_2$-CH$_2$CH$_2$-OH
—NH-CO$_2$-CH$_2$CH(CH$_3$)-OH
—NH-CO$_2$-CH(CH$_3$)-CH$_2$-OH
—CH$_2$-NH-CO$_2$-CH$_2$-CH$_2$-OH
—CH$_2$-NH-CO$_2$-CH$_2$CH(CH$_3$-OH
—CH$_2$-NH-CO$_2$CH(CH$_3$)-CH$_2$-OH
—CH$_2$NHCO$_2$CH(CH$_3$CH$_2$OH and mixtures of them;
and $R_2$ is any non-beta-hydroxyalkyl carbamate substituent. Examples of Rm substituents are:
—OH
—OR$_5$
—NHCO$_2$R$_5$
—NHCOR$_5$
—NHCOCH$_2$CH$_2$OH
—NHCOCH(CH$_3$) CH$_2$OH
—NHCOCH$_2$CH(CH$_3$) OH
—O-(CH$_2$-CH$_2$O)$_z$R$_4$
wherein $R_5$ is $C_1$-$C_{18}$ aliphatic, alicyclic, aralkyl or aromatic, $C_2$-$C_6$ alkenyl radicals, with the proviso that m is at least 2, n is o or more and the sum of m+n is less than or equal to m and more than or equal to 2. R4 is hydrogen or lower alkyl and z=1 to 10.

The preferred compounds are those where the melamine nucleus has attached to it the maximum number of hydroxyalkyl carbamates. The novel melamine compounds useful for the invention also include oligomerio forms of melamine represented by Formula (II):

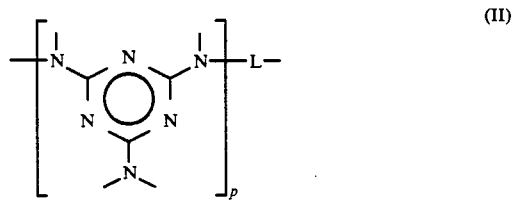

wherein the degree of polymerization, p is from 2 to 10, with values of p from to being preferred. Oligomers of melamine resins are commercially available as CYMEL®300 and 400 series of resins from American cyanamid company, Wayne, NJ, U.S.A. The melamine oligomers are typically joined by the linkage "L" as shown above wherein L is a —CH$_2$—, or —CH$_2$—O—CH$_2$—linkage which occupies sites on the melamine nucleus, the remaining reactive sites on the oligomeric nucleus must comply with the general requirement that at least 2 hydroxy alkyl carbamate.

Acetoguanamine, myclohexylguanamine, Benzoguanamine Compounds and their Oligomers.

These compounds are represented by the general Formula (III):

$$(R)C_3N_5(CH_2)_{m+n}(H)_{4-(m+n)}(R_1)_m(R_2)_n \qquad (III)$$

wherein,
m >= 2
n >= 0
4 >= (m+n) >= 2
wherein; R is alkyl or aryl (CH$_3$—for acetoguanamine merivatives, C$_6$H$_5$—for benzoguanamine derivatives, and C$_6$H$_{11}$—for cyclohexylguanamine derivatives); and where R$_1$, R$_2$, m and n are as defined above.

Oligomerio forms of acetoguanamine, benzoguanamine, and cylohexylguanamine resins having hydroxylalkylcarbamyl alkylated groups such as hydroxyethyl carbamylmethyl, and hydroxypropylcarbamylmethyl are also included.

Glycoluril and Glycoluril Oligomers.

These compounds are represented by the Formula (lv):

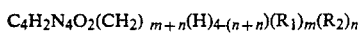

wherein,
m>=2
n>=0
4>=(m+n)>=2
and wherein $R_1$, $R_2$, m and n are as defined above.

Oligomerio forms of glycolurils having at least 2 hydroxyalkyl carbamyl alkyl groups are also included.

Imidazolidones and Imidazolidine Oligomers. These compounds are represented by Formula (v):

$$C_3H_4N_2O_3(CH_2R_1)_2 \qquad (V)$$

wherein $R_1$ is independently beta-hydroxyalkyl of from 2 to 18 carbon atoms carbon atoms.

Certain novel polybeta hydroxyalkyl carbamate heterocyclic nitrogen compounds are useful as reactant B (i) in the foam compositions of the invention. Illustrative of such novel compounds are the following.
a) tetra-beta-hydroxypropylcarbamylmethylatem benzoguanamine,
b) diacrylamidomethyl di-beta-hydroxy propyl carbamylmethylated benzoguanamine,
c) tetra-beta-hydroxypropyl carbamylmethylated cyclohexYlguanamine,
d) tetra-beta-hydroxypropyl carbamylmethylated acetoguanamine,
e) tris-aorylamimomethyl tris-betahydroxypropyl carbamylmethylated melamine,
f) tetra-betahydroxypropyl carbamylmethylated glycoluril,
g) methyl-terminated polyethylene glYcol modified penta-betahydroxypropyl carbamylmethylated melamine, and
h) polyethylene glycol modified pentabeta- hydroxypropyl carbamylmethylated melamine.

The novel heterocycio compounds used in the invention may be prepared by the reaction of (A) alkoxymethylated or hydroxymethylated(methylolated) nitrogen containing heterocyolic compounds with (B) reactants consisting of hydroxyalkyl carbamate and optional reactants.

Alternatively, the novel hymroxyalkyl carbamyl alkylated compounds of the invention may be prepared by the reaction of bis-hydroxyalkyl carbamyl alkyl amine with trichlorotriazine as disclosed in U.S. Pat. No. 4,742,118 or by the use of isocyanates reacted with 1,2 polyols as disclosed in U.S. Patent No. 4,629,999.

The nitrogen containing heterocyclic ingredient B (i) or B (ii) may be combined with reactants A (i) or A (ii) simultaneously or in any order.

The preferred compounds are those which are prepared from the polysocyanate ingredient A with essentially stoichiometrio or a slight excess of the heterocyclio beta hyroxyalkyl carbamate polyol reactant B. The simplest and the most straightforward procedure is to melt the ingredients together under slightly reduced pressure to remove volatile by-products such as lower alcohols, water, etc.

The most preferred compound is commonly prepared by reacting beta-hydroxypropyl carbamate (mixture of primary and secondary hydroxyl derivatives) with predominantly monomeric hexamethoxymethylated melamine such as CYMEL®300 or its oligomeric version CYMEL®mom, commercial products of American Cyanamid Co. The anhydrous material is obtained as a melt which may be isolated as a powder or dissolved in polyols. Frequently, it may be desirable to improve the solubility characteristics of the resin. This may be achieved by incorporating alkylcarbamates, alkyl, alkenyl and/or aryl amides on to the hetrocyclic nucleus. Also useful are alkyl-terminated polyalkylene oxides such as those sold by Union Carbide under the tradename CARBOWAX™.

It is to be understood that the method of making the novel heterocyclic polyols used in the present invention yields a mixture of products which represents a statistical distribution of the hydroxyalkyl carbamate isomers and homologues. The formulae disclosed above embrace all such mixtures.

Manufacture of Rigid Polyurethane and Polyisocvanurate Foams

The components utilized for the manufacture of rigid foams include a polyol, an organic polyisocyate or an organic polyisocyanate, an amine catalyst and a blowing agent. Optional, but important ingredients usually comprise a surfactant, a catalyst, suitable fire retardants and other additives.

The polyol component in the present invention comprises a hydroxyalkyl carbamyl alkylated polyol as described above used alone or in combination with a polyester polyol, a polyether polyol or an amine-based polyol of the type conventionally used having a hydroxyl number between 200 and 800, preferably between 300 and 700 and more preferably between about 400 and about 600 and a functionality of 2 to 6 and preferably between 3 to 6. More than catalytic amounts are used, i.e., not less than 5, preferably not less than mo and most preferably not less than mm parts by weight, based on 100 parts by weight of the polyol. Catalytic amounts, which are specifically excluded, comprise much smaller amounts, typically from 1 to 2 parts, sometimes at most 4 parts by weight, same basis. Such small amounts will not give the advantageous properties described hereinabove.

The preferred hydroxyalkyl carbamylalkylated polyol of the instant invention is typically penta/hexa functional hydroxypropylated carbamylmethylated melamine designated "6-HPC" (available from American Cyanamid Co., Wayne, NJ). The anhydrous material is dissolved in a polyol, for example, PLURACOL TM 824 (BASF) to obtain a clear non-viscous solution. Up to 30% of 6-HPO may be dissolved in the polyol without any increase in viscosity. For incorporating larger quantities, a small amount of a viscosity modifier such as propylene carbonate may be added. Propylene carbonate is available commercially from ARCO Chemical Company under the trade name of ARCONATE™, and from Texaco Chemical Company under the trade name TEXACAR™.

Suitable polyisooyanates which may be employed include aromatic, aliphatic, and cycloaliphatic polyisocyanates and combinations thereof. Representatives of these types are 2,4-toluene diisooyanate, 2,6-toluene diisooyanate, mixtures of 2,4- and 2,6-toluene diisocyanates, m-phenylene diisocyanate, p-phenylene diisocyanate, cis/trans cyclohexane diisooyanate, hexamethylene diisocyanate, m-and p-tetramethyl xylylene diisocyanate, m-xylylene diisocyanate, p-xylylene diisocyanate, naphthalene-m,m- diisocyanate, 1,3,5-hexamethyl mesitylene triisocyanate, 1-methoxyphenyl-2,4-diisocyanate, 4,4'-diphenyl-mehtane diisooyanate, 4,4,'-biphenylene diisocyana 3,3'-dimethoxy-4,4,'-diphenyl diisocyanate, 3,3'dimethyl-4,4,'-diphenyl diisocyanate, 4,4,'4"-triphenylmethane triisocyanate, toluene-2,4,6m-triisooyanate, 4,4,'-dimethyl diphenyl methane-2,2', 5,5'-tetraisocyanate, and aliphatic isocyanates such as hydrogenated MDI, hydrogenated TDI, and hydrogenatem meta- and paraxylene diisocyanate, tetramethylxylylene diisooyanate (TMXDI ®isooyanate, product of American Cyanamid co., Wayne, NJ, USA), 3:1 meta-tetramethylxylylene diisocyanate/ trimethylolpropane adduct (CYTHANE 3160®) isocyanate, product of American Cyanamid Co.), and the like. The more preferred isocyanates for use in this invention are toluene diisocyanate (TDI), 4,4'-diphenylmethane diisocyanate (MDI) and polymethylene polyphenylene polyisocyanate (polymeric MDI) which have a functionality of about m to 4 and preferably between 2.5 to 2.7. The latter isocyanates are generally produced by the phosgenation of corresponding methylene bridged polyphenyl polyamines, which are conventionally produced by the reaction of aromatic amines such as aniline with formaldehyde (U.S. Pat. Nos. 2,683,730; 2,950,263; 3,012,008; 3,344,162; and 3,362,979). Polymers and oligomers obtained by reacting diphenyl methane diisocyanate (pure MDI) or "polymeric MDI" with a monomeric glycol, or polyhydric alcohol or mixtures thereof or with a hydroxyl-ended polyester or polyetherpolyols commonly known in the art as MDI Prepolymers are also suitable. Modified MDI containing carbodiimide, uretonimine, biuret, or allophanate groups are also suitable.

Hydroxyalkylcarbamylmethylated melamine polyols of this invention can be dissolved in conventional polyols of the type conventionally used for rigid foam insulation. muitable polyols for co-blending include: propylene oxide adduots of Polyfunotional hydroxy compounds, e.g., trimethylol propane, glycerol, sorbitol, pentaerythritol, alpha-methyl glucoside, sucrose, phenolformaldehyde resins, propoxylated/ethoxylated polyfunctional amino alcohols, propoxylated/ethoxylated diamines such as methylenediphenyl diamine (MDA) and the like. Modified alkoxylated Mannioh condensates such as those disclosed in U.S. Pat. No. 4,485,195 can also be used in the present invention.

Trimerization matalysts —Examples of trimerization catalysts useful for forming polyisocyanurate forms are as follows:

1. Trimethylammonium carboxylates, such as TMR ™ and TMR-2 ™ products of Air Products Corporation.

2. 1,3,5-tris(dimethylaminopropyl)shexahydrotriazine, marketed as Polyoat 41catalyst (product of Air Products Corporation)

3. Potassium octoate or potassium acetate.

4. 2,4,6m-tris(dimethylaminomethyl)phenol alone or in combination with potassium salts, marketed as DMP-30 ™ catalyst by Rohm & Haas Company.

5. Tertiary amines in combination with epoxides, such as DABCO(diethylenetriamine) with epoxides.

Blowing Agents.—Water alone can be used to produce 100% $CO_2$ blown foams having good physical properties and dimensional stability. In addition other blowing agents can be used alone or in combination with water. Examples of other blowing agents which can be used alone or with water are: chlorofluorocarbons or hydrochlorofluorocarbons (herein designated, "CFCs"). Specific examples of CFC agents are as trichloromono- fluoromethane, dichlorodifluoromethane, dichloromono- fluoromethane, 1,1-dichloro-1-fluoroethane, 1,1-difluoro-1,2,2-trichloroethane, chloropentafluoroethane, and the like. Other useful blowing agents include low boiling hydrocarbons such ms butane, pentane, hexane, cyclohexane, etc. (U.S. Pat. No. 3,072,582). Water can also be used with mixtures of acetone and pentane such as those used in the prior art (U.S. Pat. No. 3,694,385). The quantities of blowing agent utilized is generally from about 0.4 to about 1.7 moles of water per mole of organic polyisoocyanate used. Of course larger and smaller amounts can be used. When water is used in combination with other blowing agents the ratio can vary widely, e.g., from 1 to 99 parts by weight to, correspondingly, from 99to 1 parts by weight, but preferably the amount of water in the mixtures will compose from 25 to 99+ parts.

Surfactants.—Any of the known surfactants of the prior art may be useful in the present invention. These surfactants also known as silicone oils are added as cell stabilizers. Examples of surfactants useful for the present invention are DC-193 (Dow corning), L-520, and L-521. These materials use polysiloxane polyoxylalkylene blocked copolymers such as those disclosed in U.S. Pat. Nos. 2,834,748; 2,927,480; and 2,846,458. U.S. Pat. No. discloses low viscosity alkylene oxide adducts of aniline which can be used herein both as polyols and as surfactants.

Viscosity Modifying Agents—Suitable materials are generally low molecular weight polar materials which break up hydrogen bonding and thereby increase resin "flow" by reducing viscosity in the pre-cure stage. Examples of such polar materials are propylene carbonate and ethylene carbonate. These additives may be used in amounts from 1 to 30 weight percent based on the weight of polyol.

Catalysts.—A large number of catalysts are known to be useful for producing foams. These are also suitable for producing foams of the present invention. The foams include both the tertiary amine and the organometallio type catalysts, Examples of tertiary amine catalysts which are useful for the present invention include N-alkylmorpholines, N-alkylalkanolamines, N,N-dialkyloyclohexyldiamine and alkylamines where the alkyl groups are methyl, ethyl, propyl, isopropyl, butyl, etc. These amines may be used alone or as mixtures. Specific tertiary amine catalysts include triethyl amine, tripropyl amine, tributyl amine, tripentyl amine, pyridine, quinoline, dimethylpiperazine, N-ethyl morpholine, m-methyl piperazine, N,N-dimethyl aniline, nicotine, dimethyl amino ethanol, tetramethylpropane diamine, etc. Useful organometallic catalysts include salts of bismuth, lead, tin, titanium, cobalt, aluminum, mercury, zinc, uranium, cadmium, nickel, cesium, molybdenum, vanamium, iron, copper, manganese, zirconium, etc. some examples of specific catalysts include: bismuth nitrate, potassium acetate, lead 2-ethylhexanoate, stannous octoate, dibutyl tin dilaurate, dimethyl tin dilaurate, dibutylaoetoxy distannoxane, stannous oleate, dibutyldi(m-ethyl hexanoate), ferric chloride, ferrous chloride, antimony trichloride, antimony glycolate, tin glycolate, and the like. Judicious selection of these catalysts and their proportions to be used are well within the knowledge of those skilled in the art.

Flame Retardants.—The hydroxyalkyl carbamylalkylated polyols of the present invention render the rigid foams flame retardant per se. The degree of flame retardancy achieved depends as expected on the amount of the flame retardant polyol used. Should additional flame retardancy be required, it is readily achieved by incorporating any of the known flame retardants of the prior art. Two types of flame retardants are available: those that are incorporated by mere mechanical mixing and those that become chemically bound in the polymer chain. Representatives of the first type are: tris(chloroethyl) phosphate, tris(2,3-dibromopropyl) phosphate, 2,2-bis(chloromethyl)-1,3-propylene bis(di(2-chloroethyl) phosphate), tris(1,3-dichloropropyl) phosphate, tetrakis(2-chloroethyl) ethylene diphosphate, tricresyl phosphate, cresyl diphenyl phosphate, diammonium phosphate, melamine, melamine pyrophosphate, urea phosphate (U.S.Pat. No. 3,681,273);alumina, boric acid (U.S. Pat. No. 3,897,372), various halogenated compounds and antimony oxide. Examples of the chemically bound flame retardants are chlorendic acid derivatives, the various phosphorous containing polyols, bromine containing polyols (U.. Pat. No. 4,797,429), nitrogen containing polyols (U.S. Pat No. 3,297,597). Tris(2-chloroethyl) phosphate, FYROL ®EFF and tetrakis(2-chloroethyl ethylene) diphosphate, THERMOLIN ®101, products of olin Corporation are particularly proferred. The amount of flame retardants may vary from 10 to 60parts by weight per 100 parts by weight of the polyol mixture. The preferred range is 10 to 40%.

The rigid polyurethane foams can be made in one step by the so-called "one-shot" process by reacting all of the ingredients together. The rigid foams may also be made by the "quasi-prepolymer" method wherein a portion of the polyol component is reacted with a polyisocyanate component in the absence of a catalyst. The proportion of the isocyanate component is such that it provides from about 20 to about 40of free isocyanate groups in the reaction product, based on the polyol. To prepare the foam, the remainder of the polyol is added and the two components are allowed to react in the presence of catalyst(s) and other appropriate additives such as blowing agents, fire retardants, etc., to produce a rigid foam.

It is also contemplated by the present invention to react the heterocyclic nitrogen containing beta-hydroxy urethane reactant (e.g., 6-HPC) with an excess of a polyisocyanate (e.g., R'(NCO)2) to prepare isocyanate terminated prepolymers of the type illustrated as follows:

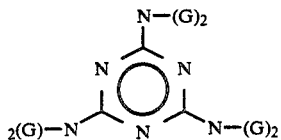

wherein G represents —CH$_2$NHCOOOH$_2$CH(CH$_3$)COONH—R'—NCO

These are useful to make improved rigid foams in accordance with the present invention.

DESCRIPTION OF THE PREFERRED EMBODIMENTS

The following examples illustrate the compositions of the present invention. They are not to be construed to limit the claims in any manner whatsoever.

The foams were prepared by two methods. In the first mathod, foams were prepared at room temperature (RT) by the one-shot, free-rise method, using a constant torque high speed mixer. The rate of foaming was followed by measuring the cream time, gel time, rise time, and tack free time. Criteria for the preparation of foams may be found in any standard reference such as Polyurethanes: chemistry and Technology Part II Technology, by maunders and Frisch, Interscience Publ. 1964,Chapter VII, Rigim Foams, pages 193-298.

Foams were also prepared using a low pressure foam machine BMOF/09 (product of, Edge Sweets, Polymer Technologies International), applying the following procedure: the isocyanate component was placed in a three gallon (11.36 liter) tank and kept at room temperature. In the second tank, a mixture containing polyol, water, surfactant, and catalyst was maintained at 53° C. because of its high viscosity. The flow of the polyol mixture and the isocyanate side was adjusted to obtain the required weight mixing ratio (isocyanate/polyol =163). The pressure in the system was 50 psi (3.52 Kg./sq. meter). The components, a total of 257.7 g, were pumped to a mixing head in 4 sec. After this quantity of reaction mixture was processed and dispensed in a mold of dimensions 5×10×10 inches (12.6 ×25.4×25.4 cm.), the mixing head was rinsed with a chlorinated solvent for five seconds and dried with compressed air for ten seconds. The foams were tested after aging at room temperature for seven days.

The foam properties were determined by ASTM methods as follows:

| Foam density | ASTM D-1622 |
| Compressive strength | ASTM D-1621 |
| Tumbling friability | ASTM C-421 |

The thermal conductivity (K-factor) of the rigid foams was measured on a thermal conductivity analyzer (Anacon TCA-8). Combustibility was determined by measuring burn times in a Butler Chimney Test (see, Journal of Cellular Plastics, Volume 11, pages 497-501, 1967, and test procedure, ASTM No. D-3014-76) and by measuring the weight percent of residue after burning, the higher the percentage or residue, the lower the combustibility.

EXAMPLE 1

(a) Reaction Product of 6 Moles of Hydroxypropyl carbamate with Mole of Hexamethoxymethylmelamine. Hexamethoxymethylmelamine (81.9 g, 0.21 mole, American Cyanamim Co. CYMEL ®300), hydroxypropyl carbamate (150.0 g, 1.26 mole), and para-toluenesul- fonic acid (1.16 g) were stirred at 75° C. in a flask equipped with a vacuum distillation head. During 80 minutes, the pressure is lowered in stages to 50 mm Hg and 37.2 g of methanol (1.02 mole, 81% of theoretical) was collected in the distillate receiver. The product in the reaction flask was cooled to near room temperature, where it was a clear, colorless glass which was soluble in methanol, ethylene glycol or water. The product was of the formula:

$C_3N_6(CH_2NHCOOC_3H_6OH)_6$

The equivalent weight of the product was 156.4.

(b) Preparation of Rigid Urethane-Urea Foams.—Following the one-shot procedure previously described above and using the product of step (a), foams were prepared and tested. For comparison purposes a commercial polyol was used to prepare a foam. The formulations used and the results obtained are summarized as follows:

TABLE 1

|  | Example | |
|---|---|---|
|  | 1A* | 1 |
| Ingredients (parts/wt) | | |
| Sucrose based polyol[a] | 100.0 | 70.0 |
| Hydroxyalkyl carbamylated melamine polyol[b] | — | 30.0 |
| Silicone Surfactant[c] | .20 | 3.20 |
| 33% Triethylene diamine in dipropylene glycol[d] | 1.80 | 1.80 |
| Dibutyltin dilaurate catalyst | 0.10 | 0.10 |
| Water as blowing agent | 4.50 | 4.00 |
| Polymeric methylene polyisocyanate[e] | 161.0 | 148.0 |
| Isocyanate Index | 105 | 105 |
| Reaction Profile | | |
| Cream time (sec) | 23 | 22 |
| Gel time (sec) | 37 | 36 |
| Rise time (sec) | 60 | 51 |
| Tack free time (sec) | 62 | 72 |
| Properties | | |
| Density (pcf) | 2.10 | 2.00 |
| Friability (% weight loss) | 2.3 | Burning |
| test (Butler Chimney): | | |
| Burning time (sec) | 30 | 34 |
| Residue after burning (wt %) | 26.4 | 75.6 |
| K-factor (w/m/deg) perpendicular Initial (after cutting) | 0.0220 | 0.0323 |

*Comparative Example
[a]"VORANOL 360", Dow Chemical Company
[b]Prepared as in step (a)
[c]"DC-193", Dow Corning Company
[d]"DABCO 33LV", Air Products Company
[e]"MONDUR-MR", Mobay Company The foregoing results demonstrate that the substitution of a minor proportion of the commercial polyol by the heterocyclio polyol in accordance with this invention provides foams with vastly increased fire resistance while retaining insulation resistance of a high order and also physical strength. The data indicate that the heterocyclic polyol can be classified as a reactive flame retardant.

EXAMPLE 2

(a) Reaction Product of 6 Moles of Hydroxyethyl Carbamate with 1 Mole of Hexamethoxymethylmelamine. Hexamethoxymethylmelamine (81.9 g, 0.21 mole, American Cyanamid Co. CYMEL® 300), hydroxyethyl carbamate (1.26 mole), and para-toluenesulfonic acid (1.16 g) was reacted as described in Example 1, step.

(a) The product was of the formula:

$C_3N_6(CH_2NHCOOC_2H_4OH)_6$

The equivalent weight of the product is 132.6.

(b) Preparation of Rigid Urethane-Urea Foams.—Following the one-shot procedure previously described and using the product of step (a), foams were prepared and tested. For comparison purposes a commercial polyol was used to prepare a foam. The formulations used and the results obtained are summarized as follows:

TABLE 2

|  | Example | |
|---|---|---|
|  | 2A* | 2 |
| Ingredients (parts/wt) | | |
| Sucrose based polyol[a] | 100.0 | 80.0 |
| Hydroxyalkyl carbamylated melamine polyol[b] | — | 20.0 |
| Silicone Surfactant[c] | 3.20 | 3.20 |
| 33% Triethylene diamine in dipropylene glycol[d] | 1.80 | 1.80 |
| Dibutyltin dilaurate catalyst | 0.10 | 0.10 |
| Water as blowing agent | 4.50 | 4.50 |
| Polymeric methylene polyisocyanate[e] | 161.0 | 165.0 |
| Isocyanate Index | 105 | 105 |
| Reaction Profile | | |
| Cream time (sec) | 22 | 22 |
| Gel time (sec) | 40 | 36 |
| Rise time (sec) | 58 | 56 |
| Tack free time (sec) | 62 | 70 |
| Properties | | |
| Density (pcf) | 2.10 | 2.07 |
| Friability (% weight loss) | 2.30 | 1.84 |
| K-factor (W/m/deg) perpendicular | | |
| Initial (after cutting) | 0.0220 | 0.0229 |
| Aged (1 week at RT) | 0.0271 | 0.0245 |

*Comparative Example
[a]"VORANOL 360", Dow Chemical Company
[b]Prepared as in step (a)
[c]"DC-193", Dow Corning Company
[d]"DABCO 33LV", Air Products Company
[e]"MONDUR-MR", Mobay Company The foregoing results demonstrate that the substitution of a minor proportion of the commercial polyol by the heterooyolic polyol in accordance with this invention provided foams with insulation resistance of a high order and also physical strength as shown by decreased friability.

EXAMPLE 3

(a) Reaction product of 6 Moles of Hydroxypropyl carbamate with 1 Mole of hexamethoxy-methylmelamine.—This was prepared by the procedure of Example 1, step (a).

(b) Preparation of Rigid Urethane-Urea Foams.—Following the one-shot procedure previously described and using the product of step (a), but substituting an aromatio amine based polyol for the suorose based polyol, foams were prepared and tested. For comparison purposes a commercial polyol was used to prepare a foam. The formulations used and the results obtained are summarized as follows:

TABLE 3

|  | Example | |
|---|---|---|
|  | 3A* | 3 |
| Ingredients (parts/wt) | | |
| Aromatic amine based polyol[a] | 100.0 | 80.0 |
| Hydroxyalkyl carbamylated melamine polyol[b] | — | 20.0 |
| Silicone Surfactant[c] | 3.15 | 3.20 |
| % Triethylene diamine in dipropylene glycol[d] | 1.20 | 1.60 |
| Dibutyltin dilaurate catalyst | 0.10 | 0.30 |
| Water as blowing agent | 4.50 | 4.50 |
| Polymeric methylene diisocyanate[e] | 164.0 | 163.0 |
| Isocyanate Index | 105 | 105 |
| Reaction Profile | | |
| Cream time (sec) | 23 | 23 |
| Gel time (sec) | 38 | 41 |
| Rise time (sec) | 46 | 48 |

TABLE 3-continued

| | Example | |
|---|---|---|
| | 3A* | 3 |
| Tack free time (sec) | 54 | 55 |
| Properties | | |
| Density (pcf) | 1.84 | 1.84 |
| K-factor (W/m/deg) perpendicular | | |
| Initial (after cutting) | 0.0232 | 0.0213 |
| Aged (1 week at RT) | 0.0243 | 0.0227 |
| Aged (2 weeks at RT) | 0.0307 | 0.0239 |
| Dimensional stability at RT (Shrinkage)** | | |
| Aged (1 week) | 2M/2D | 4S |
| Aged (2 weeks) | 1M/3D | 1M/3S |

*Comparative Example
**deformation: N = none; S = slight; M = moderate; D = heavy, and the number of specimens
$^a$"PLURACOL 824", BASF Chemical Company
$^b$Prepared as in step (a)
$^c$"DC-193", Dow Corning Company
$^d$"DABCO 33LV", Air Products Company
$^e$"MONDUR-MR", Mobay Company The foregoing results demonstrate that the substitution of a minor proportion of the commercial polyol by the heterocyclic polyol in accordance with this invention provided foams with insulation resistance of a high order coupled with stability on aging and also physical strength as shown by decreased distortion and shrinkage upon aging.

EXAMPLE 4 TO 20

The general procedure of Examples 1 to 3 was used to prepare, mold and test rigid foams according to this invention comprising polyhydroxyalkyl carbamyl polymeric melamines. The formulations used and the properties obtained are set forth in Table 4 as follows (for sources and descriptions, see also footnotes to Table 1):

TABLE 4

Rigid Polyurethane and Polyisocyanurate Foams

| | Example | | | | | | | | | |
|---|---|---|---|---|---|---|---|---|---|---|
| | 4A* | 4 | 5A* | 5 | 6A* | 6 | 7 | 8 | 9 | 10 |
| Composition (pbw): | | | | | | | | | | |
| Other polyol | 100$^a$ | 80$^a$ | 100$^a$ | 80$^a$ | 100$^b$ | 80$^b$ | 80$^b$ | 70$^b$ | 60$^b$ | 60$^b$ |
| Alkylcarbamyl polyol | — | 20$^c$ | — | 20$^c$ | — | 20$^c$ | 20$^c$ | 30$^c$ | 40$^c$ | 40$^c$ |
| Silicone surf. | 3.15 | 3.2 | 3.15 | 3.20 | 3.20 | 3.20 | 3.20 | 3.20 | 3.20 | 3.20 |
| Triethylenediamine solution | 1.2 | 1.6 | 1.6 | 1.6 | 1.8 | 1.8 | 1.8 | 1.8 | 1.8 | 1.8 |
| Dibutyltin dilaurate | 0.10 | 0.30 | 0.30 | 0.30 | 0.10 | 0.10 | 0.10 | 0.2 | 0.2 | 0.19 |
| Water as blowing agent | 4.5 | 4.5 | 2.0 | 2.0 | 4.5 | 4.5 | 4.5 | 4.0 | 4.0 | 4.0 |
| CFC as blowing agent | — | — | 12.0 | 12.0 | — | — | — | — | — | — |
| Polymeric MDI | 164 | 163 | 126 | 124.8 | 161 | 161 | 161 | 148 | 148 | 148 |
| Tri(2-chloropropyl) phosphate | — | — | — | — | 10 | — | 10 | 10 | — | 10 |
| Isocyanate Index | 105 | 105 | 105 | 105 | 105 | 105 | 105 | 105 | 105 | 105 |
| Reaction Profile: | | | | | | | | | | |
| Cream time (sec) | 23 | 23 | 18 | 21 | 22 | 20 | 21 | 22 | 23 | 22 |
| Gel time (sec) | 38 | 41 | 41 | 28 | 37 | | 35 | 40 | 38 | 42 |
| Rise time (sec) | 46 | 48 | 37 | 45 | 60 | 45 | 46 | 60 | 52 | 62 |
| Tack free time (sec) | 54 | 55 | 40 | 51 | 63 | 45 | 58 | 72 | 75 | 76 |
| Properties: | | | | | | | | | | |
| Density (pcf) | 1.84 | 1.84 | 1.96 | 1.97 | 1.98 | 2.03 | 1.96 | 1.98 | 2.08 | 1.96 |
| Friability (%) | 1.50 | 2.40 | 2.50 | 2.05 | — | 1.3 | — | — | — | — |
| K-factor (w/m deg) | .0220 | .0213 | .0191 | .0179 | — | .0295 | — | — | .0337 | — |
| Residue after burning (wt %) | — | — | — | — | 47.7 | 25.8 | 42.6 | 81.3 | 73.5 | 82.9 |

| | Example | | | | | | | | |
|---|---|---|---|---|---|---|---|---|---|
| | 11 | 12 | 13 | 14A* | 14 | 15 | 16 | 17 | 18 |
| Composition (pbw): | | | | | | | | | |
| Other polyol | 50$^b$ | 80$^a$ | 50$^a$ | 100$^a$ | 19.2$^b$ | 80$^a$ | 80$^a$ | 80$^a$ | 80$^a$ |
| Alkylcarbamyl polyol | 50$^d$ | 20$^d$ | 50$^d$ | — | 80.0$^c$ | 20$^c$ | 20$^c$ | 20$^c$ | 20$^c$ |
| Silicone surf. | 3.2 | 3.2 | 3.2 | 5.7 | 5.7 | 3.2 | 3.2 | 3.2 | 3.2 |
| Triethylenediamine Solution | 1.8 | 1.8 | 1.8 | 12.6 | 12.6 | 1.6 | 1.6 | 1.2 | 0.9 |
| Dibutyltin dilaurate | 0.10 | 0.10 | 0.10 | 0.25 | 0.25 | 0.3 | 0.3 | 0.2 | 0.1 |
| Water as blowing agent | 4.5 | 4.0 | 4.0 | 4.0 | 4.0 | 4.2 | 4.2 | 8.5 | 4.5 |
| CFC as blowing agent | — | — | — | 9.66 | 9.66 | — | — | — | — |
| Polymeric MDI | 170 | 166 | 160 | 371 | 370 | 166 | 174 | 224 | 163 |
| Tri(2-chloropropyl) phosphate | — | — | — | — | — | — | — | — | — |
| Isocyanate Index | 105 | 105 | 105 | (250) | (250) | 110 | 115 | (224) | 105 |
| Reaction Profile: | | | | | | | | | |
| Cream time (sec) | 23 | 20 | 17 | 24 | 28 | 21 | 22 | 24 | 19 |

TABLE 4-continued

| Rigid Polyurethane and Polyisocyanurate Foams | | | | | | | | | |
|---|---|---|---|---|---|---|---|---|---|
| Gel time (sec) | 35 | 38 | 32 | 32 | 40 | 40 | 41 | 40 | 28 |
| Rise time (sec) | 75 | 45 | 42 | 60 | 66 | 50 | 52 | 52 | 32 |
| Tack free time (sec) | 74 | 53 | 42 | 82 | 87 | 58 | 58 | 60 | 43 |
| Properties: | | | | | | | | | |
| Density (pcf) | 2.09 | 2.07 | 2.09 | 2.04 | 2.06 | 2.01 | 1.99 | 1.02 | 2.04 |
| Friability (%) | 2.09 | 1.90 | 1.90 | 19.24 | 7.52 | — | — | — | — |
| K-factor (w/m deg) | .0241 | .0234 | .0224 | .0225 | .0216 | .0218 | .0227 | .0323 | .0235 |
| Residue after burning (wt %) | — | — | — | — | — | — | — | — | — |

*"PLURACOL-824" Aromatic Amine-based polyol (Eq. wt. 143.8) BASF Co.
*"VORANOL-360" Sucrose-based polyol (Eq. wt. 156) Dow Chemical Co.
'Beta-hydroxypropylcarbamyl methylated melamine polyol (Eq. wt. 156.4) Ex. 1, Step (a)
*Beta-hydroxyethylcarbamyl methylated melamine polyol (Eq. wt. 132.6) Ex. 3, Step (a)
Isocyanate Index = moles 100 × (moles —NCO/moles —OH)
Examples 14A* and 14 illustrate urethane-urea modified isocyanurate foams
Example 17 illustrates a low density foam
Example 18 illustrates a foam prepared in a laboratory foam machine Certain beta-hydroxy carbamate heterocyclic nitrogen compounds have dual use as novel polyols for the preparation of rigid foams and as chemically bound flame retardants. The compounds and their method of preparation are set out in Example 21 to 28 below:

General Procedure

The following general procedure was used to prepare the compounds of Examples 21to 28. A heterocyclic nitrogen amino resin reactant was combined in a flask with a beta-hydroxy carbamate reactant, and an optional third reactant plus 0.5 to 1 weight percent of para-toluenesulfonic acid or nitric acid (based on the weight of amino resin). The contents of the flask (equipped with a vacuum distillation head) were stirred at 75° C. to 90° C. for about 1 to 3 hours and volatiles such as water and methanol removed under reduced pressure. The reaction product in the flask was then cooled to near room temperature.

EXAMPLE 21

Preparation of tetra-beta-hydroxypropyl-carbamyl-methylated benzoguanamine.
The General Procedure given above was repeated using as heterocyclic nitrogen amino resin reactant, tetramethoxymethyl benzoguanamine, and as the beta-hydroxy carbamate reaotant, beta-hydroxypropyl carbamate, where the reactants were charged to the reaction flask in a 1:4 mole ratio, respectively.
The reaction product resulted in a compound of the following general formula:

$$\begin{array}{c} R_1 \diagdown \quad N \quad \diagup R_1 \\ \phantom{R_1}N \diagup \phantom{N} \diagdown N \\ R_2 \diagup \phantom{N} \diagdown \phantom{N} \diagdown R_2 \\ \phantom{R_2}N \diagdown \phantom{N} \diagup N \\ \phantom{R_2 N}R_3 \end{array}$$

where, $R_1 = R_2 =$ 
$\begin{array}{c} CH_3 \\ | \\ CH_2NHCOOCHCH_2OH \\ + \\ CH_2NHCOOCH_2CHOH \\ | \\ CH_3 \end{array}$ $R_3$ = phenyl ($C_6H_5$—)

Physical Properties of the compound of Example 21 are as follows:

| | |
|---|---|
| Softening Range, °C. | 20–30 |
| Solubility: soluble in methanol, ethanol | |
| Infrared Peaks (all infrared spectra taken on thin films) | |
| OH/NH | 3350 |
| carbamate (C=O) | 1715 |
| phenyl | 785, 710 |

EXAMPLE 22

Preparation of diacrylamidomethyl dibetahydroxypropyl carbamylemthylated benzoguanamine.
The General Procedure given above was repeated using as heterocyclic nitrogen amine reactant, tetramethoxymethyl benzoguanamine, as the beta-hydroxy carbamate reactant, beta-hydroxypropyl carbamate, and as the thierd reactant acrylamide, where the reactants were charged to the reaction flask in a 1:2:2 mole ratio, respectively.
The reaction product resulted in a compound of the following general formula:

$$\begin{array}{c} R_1 \diagdown \quad N \quad \diagup R_1 \\ \phantom{R_1}N \diagup \phantom{N} \diagdown N \\ R_2 \diagup \phantom{N} \diagdown \phantom{N} \diagdown R_2 \\ \phantom{R_2}N \diagdown \phantom{N} \diagup N \\ \phantom{R_2 N}R_3 \end{array}$$

where, $R_1 =$ 
$\begin{array}{c} CH_3 \\ | \\ CH_2NHCOOCHCH_2OH \\ + \\ CH_2NHCOOCH_2CHOH \\ | \\ CH_3 \end{array}$ $R_2 = CH_2NHCOCH{=}CH_2$ $R_3$ = phenyl ($C_6H_5$—)

Physical Properites of the compound of Example 22:

| | |
|---|---|
| Softening Range, °C. | 45–50 |
| Solubility, soluble in ethanol, acetone, $CH_2CL_2$ | |
| Infrared Peaks (all infrared spectra taken on thin films) | |
| OH/NH | 3310 |

| -continued | |
|---|---|
| carbamate (C=O) | 1712 |
| acrylamide (C=O) | 1675 |
| acrylamide (C=C) | 1625 |
| acrylamide (NH) | 1535 |
| phenyl | 785, 705 |

EXAMPLE 23

Preparation of tetra-beta-hydroxypropyl carbamylmethylated cyclohexylguanamine.

The General Procedure given above was repeated using as heterocyclic nitrogen amine reactant, tetramethoxymethyl cyclohexylguanamine, and as the beta-hydroxy carbamate reactant, beta-hydroxpropyl carbamate, where the reactant were charged to the reaction flask in a 1:4 mole ratio, respectively.

The raction product resulted in a compound that had a mixture of the following $R_1$ and $R_2$ groups:

The reaction product resulted in a compound of the following general formula:

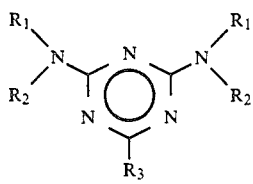

that had the following $R_1$ and $R_2$ groups:

$$R_1 = R_2 = \begin{array}{c} CH_3 \\ | \\ CH_2NHCOOCHCH_2OH \\ + \\ CH_2NHCOOCH_2CHOH \\ | \\ CH_3 \end{array}$$

$R_3$ = cyclohexyl ($C_6H_{11}-$)

Physical PRoperties of the compound of Example 23:

| Solubility, soluble in ethanol, acetone, $CH_2CL_2$ | |
|---|---|
| Infrared Peaks (all infrared spectra taken on thin films) | |
| OH/NH | 3340 |
| carbamate (C=O) | 1715 |

EXAMPLE 24

Preparation of tetra-beta-hydroxypropyl carbamylmethylated acetoguanamine.

The General Procedure given above was repeated using as heterocyclic nitrogen amine reactant, tetramethoxymethyl acetoguanamine, and as the beta-hydroxy carbamate reactant, beta-hydroxypropyl carbamate, where the reactans were charged to the reaction flask in a 1:4 mole ratio, respectively.

The reaction product resulted in a compound of the following general formula:

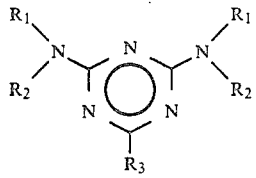

that had the following $R_1$ and $R_2$ groups:

$$R_1 = R_2 = \begin{array}{c} CH_3 \\ | \\ CH_2NHCOOCHCH_2OH \\ + \\ CH_2NHCOOCH_2CHOH \\ | \\ CH_3 \end{array}$$

$R_3$ = methyl ($CH_3-$)

Physical Properties of the compound of Example 24:

| Softening Range, °C. | 57-64 |
|---|---|
| Solubility, soluble in ethanol, acetone, $CH_2CL_2$ | |
| Infrared Peaks (all infrared spectra taken on thin films) | |
| OH/NH | 3350 |
| carbamate (C=O) | 1715 |

EXAMPLE 25

Preparation of tris-acrylamidomethyl trisbetahydroxypropyl carbamylmethylated melamine.

The General Procedure given above was repeated using as heterocyclic nitrogen amine reactant, hexamethoxymethyl melamine, as the beta-hydroxy carbamate reactant, beta-hydroxypropyl carbamate, and as the third reactant acrylamide, where the reactants were charged to the reaction flask in a 1:3:3 mole ratio, respectively.

The reaction product resulted in a compound of the following general formula:

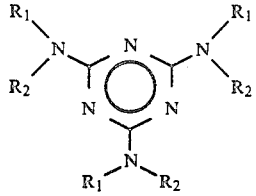

that had the following $R_1$ and $R_2$ groups:

$$R_1 = \begin{array}{c} CH_3 \\ | \\ CH_2NHCOOCHCH_2OH \\ + \\ CH_2NHCOOCH_2CHOH \\ | \\ CH_3 \end{array}$$

$R_2 = CH_2NHCOCH=CH_2$

Physical Properties of the compound of Example 25:

| Softening Range, °C. | 25-35 |
|---|---|
| Solubility, soluble in ethanol, acetone, $CH_2Cl_2$ | |
| Infrared Peaks (all infrared spectra taken on thin films) | |
| OH/NH | 3320 |
| carbamate (C=O) | 1715 |

| -continued | |
|---|---|
| acrylamide (C=O) | 1675 |
| acrylamide (C=C) | 1625 |
| acrylamide (NH) | 1540 |

EXAMPLE 26

Preparation fo tetra-betahydroxypropyl cargamylmethylated glycoluril.

The General Procedure given above was repeated using as heterocyclic nitrogen amine reactant, tetramethoxymethyl glycoluril, and as the beta-hydroxy carbamate reactant, beta-hydroxypropyl carbamate, where the reactanst were charged to the reaction flask in a 1:4 mole ratio, respectively.

The reaction product resulted in a compound of the following general formula:

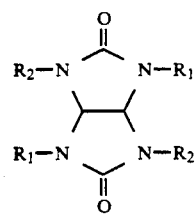

that had the following $R_1$ and $R_2$ groups:

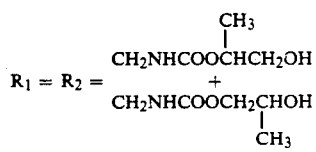

Physical PRoperties of the compound of Example 26:

| Softening Range, °C. | 72–90 |
|---|---|
| Solubility, soluble in ethanol, acetone, $CH_2Cl_2$. | |
| Infrared Peaks (all infrared spectra taken on thin films) | |
| OH/NH | 3330 |

EXAMPLE 27

Preparation of methyl-terminated polyethylene glycol modified penta-beta-hydroxypropyl carbamylmethylated melamine.

The General Procedure given above was repeated using as heterocyclic nitrogen amino resin reactant (CYMEL 303 amino resin, product of American Cyanamid Company), as the beta-hydroxy carbamate reactant, beta-hydroxypropyl carbamate, and as the optional reactant MePEG 350 a product of Union Carbide Company, where the reaotants were charged to the reaction flask in a 1:5:1 mole ratio, respectively. The reaction product resulted in a compound that had the following $R_1$ and $R_2$ groups:

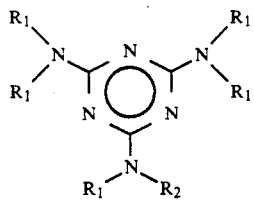

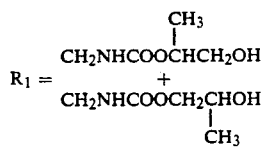

$R_2$ = methyl terminated polyethylene glycol-350

Physical Properties of the compound of Example 27:
Physical Characteristics: waxy solid at room temperature
Solubility : soluble in chloroform, methylene chloride, and dimethylforamide

EXAMPLE 28

Preparation of polyethylene glycol modified penta-betahydroxypropyl carbamylmethylated melamine The General Procedure given above was repeated using as heterocyclic nitrogen amino resin reactant (CYMEL ® 303 amino resin, product of American Cyanamid company), as the beta-hydroxy carbamate reactant, beta-hydroxypropyl carbamate, and as the optinal reactant polyethylene glycol (Carbowax ® 300, product of Union Carbide Company), where the reactants were charged to the reaction flask in a 1:5:1 mole ratio, respectively.

The reaction product resulted in a compound that had the following $R_1$ and $R_2$ groups:

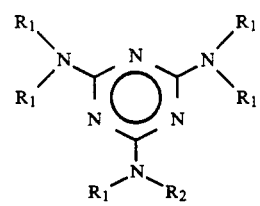

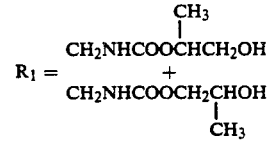

$R^2$ = polyethylene glocol (MW 300)

Physical Properties of the compound of Example 28:
Characteristics: low melting solid.
Solubility: soluble in chloroform, methylene chloride, and dimethylforamide.

The patents, applications, publications and test methods mentioned above are incorporated herein by reference.

Many variations of the present invention will suggest themselves to those skilled in the art in light of the above detailed description.

We claim:

1. A rigid polyurethane and/or polyisocyanurate foam having predominantly closed cells comprising a product of reacting:
A.
   (i) an organic polyisocyanate, or
   (ii) an organic polyisocyanate and a trimerization catalyst in an amount effective to produce a urethane-urea-modified isocyanurate;
B. a polyhydroxy-containing material comprising;
   (i) a heterocyclio nitrogen reactant containing two or more beta-hydroxy urethane groups, or
   (ii) a combination of B (i) and at least one other polyhydroxy-oontaining material; and
C. a blowing agent.

2. A foam as defined in claim 1 wherein component A (i) comprises toluene diisocyanate (TDI), 4,4'-diphenylmethane diisocyanate (MDI), polymethylene polyphenylene polyisocyanate (polymeric MDI) or a mixture of any of them, component A (ii) comprises a polyamino trimerization catalyst and toluene diisocyanate (TDI), 4,4'-diphenylmethane diisocyanate (MDI), polymethylene polyphenylene polyisocyanate (polymeric MDI) or a mixture of any of them, and both components have a functionality of about 2 to about 4.

3. A foam as defined in claim 2 wherein components A (i) and (ii) have a functionality between 2.5 and 2.7.

4. A foam as defined in claim 1 wherein component A (i) comprises polymeric MDI and component A (ii) comprises polymeric MDI and a trimerization catalyst selected from the group consisting of trimethylammonium carboxylates, 1,3,5-tris(dimethyl-aminomethyl) phenols, potassium octoate, potassium acetate, 2,4,6-tris-(dimethylaminomethyl) phenol, an tertiary amines in combination with epoxides.

5. A foam as defined in claim 1 wherein component B (i) comprises a heterocyolic polyol containing at least two betahydroxy terminated carbamate groups on a nucleus selected from melamine, an oligomer of melamine, an alkyl/aryl guanamine selected from benzoguanamine, an oligomer of benzoguanamine, aoetoguanamine, an oligomer of acetoguanamine, cyclohexylguanamine, an oligomer of cyclohexylguanamine, a glycoluril, an oligomer of a glycoluril, a 4,5-dihydroxy-2-imidazolidone compound, an oligomer of such imidazolidone compound, and a mixture of any of the foregoing.

6. A foam as defined in claim 5 wherein component B (i) is derived from the group consisting of melamine, acetoguanamine, benzoguanamine, a glycoluril, an oligomer of any of them and a mixture of any of them.

7. A foam as defined in claim 6 wherein component B (i) is derived from melaine or an oligomer thereof.

8. A foam as defined by claim 6 wherein component B (i) is selected from the group consisting of the following compounds and other oligomers:
   a) tetra-beta-hydroxypropylcarbamylmethyl benzoguanamine,
   b) diacrylamidomethyl dibeta-hydroxypropyl carbamylmethylated benzoguanamine,
   c) tetra-beta-hydroxypropyl oarbamylmethylated cyclohexylguanamine,
   d) tetra-beta-hydroxypropyl carbamylmethylated acetoguanamine,
   e) tris-acrylamidomethyl tris-betahydroxypropyl carbamYlmethylated melamine,
   f) tetra-betahydroxypropyl carbamylmethylated glycoluril,
   g) methyl-terminated polyethylene glycol modified penta-betahydroxypropyl carbamylmethylated melamine, and
   h) polyethylene glycol modified pentabeta-hydroxypropyl carbamylmethylated melamine.

9. A foam as defined in claim 1 wherein component the other polyhydroxy-containing material of B (ii) comprises a polyester polyol, a polyether polyol, an amine-based polyol or a mixture of any of them.

10. A foam as defined in claim 1 wherein component C consists essentially of water.

11. A foam as defined in claim 1 wherein component also includes a second blowing agent comprising seleoted from the group consisting of a chlorofluorocarbon, a hydroohlorofluorooarbon, or mixtures thereof.

12. A foam as defined in claim 1 which is the product of reacting A, B, C and, anoptional component selected from the group consisting of;
   D. a surfactant;
   E. a curing catalyst;
   F. a flame retardant compound; or
   G. a visoosity modifying agent
   H. a mixture of any of them.

13. A foam as defined in claim 12 wherein surfactant component D comprises a silicone surfactant.

14. A foam as defined in claim 12 wherein curing catalyst E comprises dibutyltin dilaurate.

15. A foam as defined in claim 12 wherein flame retardant compound F comprises tri(2-chloropropyl) phosphate.

16. A foam as defined in claim 12 wherein the visoosity modifying agent is propylene carbonate.

17. The foam of claim 1 wherein polyol ingredient B (i) is a melamine type compound represented by the formula (I):

$$C_3N_6(CH_2)_{m+n}(H)_{6-(m+n)}(R^1)_m(R^2)_n \qquad (I)$$

wherein,
$m >= 2$
$n >= 0$
$6 >= (m+n) >= 2$
and where $R_1$ is a beta-hydroxy carbamate substituent selected from the group consisting of
—NH-CO$_2$-CH$_2$-OH
—NH-CO$_2$-CH$_2$CH (CH$_3$)-OH
—NH-CO$_2$-CH(CH$_3$)-CH$_2$-OH
—CH$_2$-NH-CO$_2$-CH$_2$-CH$_2$-OH
—CH -NH-CO$_2$-CH$_2$CH(CH$_3$)-OH
-CH$_2$-NH-CO$_2$CH(CH$_3$)-CH$_2$-OH
and mixtures of the above, and;
wherein $R_2$ is any non-beta-hydroxyalkylcarbamate substituent.

18. The foam of claim 17 wherein the substituent $R_2$ of B (i) is selected from the group consisting of;
—OH
—OR$_5$
—NHCO$_2$R$_5$
wherein $R_5$ is Cl-C$_{18}$ aliphatic, alicyclic, aralkyl or aromatio, C$_2$-C$_6$ alkenyl radicals, with the proviso that m is at least 2, n is o or more and the sum of m =n is less than or equal to 6 and more than or equal to 2. R4 is hydrogen or lower alkyl and z= 1 to 10.

19. The foam of claim 1 wherein the polyol ingredient B (i) is a benzoguanamine type compound represented by the formula;

$$(R)C_3N_5CH_2)_{m+n}(H)_{4-(m+n)}(R_1)_m(R_2)_n$$

wherein,
$m >= 2$
$n >= 0$
$4 >= (m+n) >= 2$
and wherein,
R is selected from the group consisting of alkyl and aryl, and where R is a beta-hydroxy carbamate substituent selected from the group consisting of
-NH-cOz-OHzcHz-OH
-NH-CO (CH )-OH
-NH-00 -cH(cH )-OH
-CHz-NH-CO
-OH -NH-C0
-OH -NH-O0 H(H )-H
and mixtures of the above, and wherein $R_2$ is any non-beta-hydroxy carbamate substituent.

20. The foam of claim 19 wherein the polyol ingredient B (i) is a substituted benzoguanamine wherein (R) is selected from the group consisting of methyl, phenyl, and cyclohexyl.

21. The foam of claim 19 wherein the substituent of B (i) is selected from the group consisting of; -OR$
-NHOO R$ -NHOOR$ -NHOOOH OH 0H
-NHOOOH(OH )cHOH -NHOOOH CH(CH)OH
-0-(0H
wherein $R_5$ R is $C_1$-$C_{18}$ aliphatic, alicyclic, aralkyl or aromatic, $C_2$-$C_6$ alkenyl radicals, with the proviso that m is at least 2, n is o or more and the sum of m +n is less than or equal to 6 and more than or equal to 2. $R_4$ is hydrogen or lower alkyl and $z = 1$ to 10.

22. The foam of Claim wherein the polyol ingredient B (i) is a glycoluril represented by the formula:

23. The foam of claim 22 wherein the substituent $R_2$ of B (i) is seleoted from the group consisting of; wherein $R_5$ is $C_1$-$C_{18}$ aliphatic, alicyclic, aralkyl or aromatic, $C_2$-$C_6$ alkenyl radicals, with the proviso that m is at least 2, n is o or more and the sum of m +n is less than or equal to 6 and more than or equal to 2. $R_4$ is hydrogen or lower alkyl and $z = 1$ to 10.

24. The foam of claim 1 wherein the polyol ingredient B (i) is an imidazolidone represented by the formula;

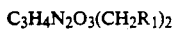
$C_3H_4N_2O_3(CH_2R_1)_2$ and where $R_1$ is a beta-hydroxy carbamate substituent selected from the group consisting of
—NH-00
NH-Oo )-0H
-NH-00-CH( -0H
-CH-NH-C0
-OHz-NH-COz-OHOH(CH)-OH
-CH -NH-C0 -CH -0H
and mixtures of the above, 25. An article shaped from the composition of claim 1.

26. A polyol selected from the group consisting of tetra-beta-hydroxYpropyloarbamylmethyl benzoguanamine, oligomers of tetra-beta-hydroxypropylcarbamylmethyl benzoguanamine, and mixtures thereof.

27. A polyol selected from the group consisting of diacrylamidomethYl dibeta-hydroxypropyl carbamylmethylated benzoguanamine, oligomers of diacrylamidomethyl dibeta-hydroxypropyl carbamylmethylated benzoguanamine, and mixtures thereof.

28. A polyol selected from the group consisting of tetra-beta-hydroxypropyl carbamylmethylated cyclohexylguanamine, oligomers of tetra-beta-hydroxypropyl carbamylmethylated cyclohexylguanamine, and mixtures thereof.

29. A polyol selected from the group consisting of tetra-beta-hydroxypropyl carbamylmethylated acetoguanamine, oligomers of tetra-beta-hydroxypropyl carbamylmethylated acetoguanaine, and mixtures thereof.

30. A polyol seleoted from the group consisting of tris-acrylamidomethyl tris-betahydroxypropy carbamylmethylated melamine, oligomers of tris-acrylamidomethyl tris-betahydroxypropyl carbamylmethylated melamine, and mixtures thereof.

31. A polyol selected from the group consisting of tetra-betahydroxypropyl carbamylmethylated glycoluril, oligomers of tetra-betahydroxypropyl carbamylmethylated glycoluril, and mixtures thereof.

32. A polyol selected from the group consisting of methyl-terminated polyethylene glycol modified penta-betahydroxypropyl carbamylmethylated melamine, oligomers of methyl-terminated polyethylene glycol modified penta-betahydroxypropyl carbamylmethylated melamine, and mixtures thereof.

33. A polyol selected from the group consisting of polyethylene glycol modified penta-betahydroxypropyl carbamylmethylated melamine, oligomers of polyethylene glycol modified penta-betahydroxypropyl carbamylmethylated melamine, and mixtures thereof.

* * * * *